United States Patent
Ozawa

(10) Patent No.: US 8,795,424 B2
(45) Date of Patent: *Aug. 5, 2014

(54) INK FOR INK-JET RECORDING APPARATUSES AND IMAGE FORMING METHOD

(71) Applicant: Kyocera Document Solutions Inc., Osaka (JP)

(72) Inventor: Noriaki Ozawa, Osaka (JP)

(73) Assignee: Kyocera Document Solutions Inc., Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 13/770,891

(22) Filed: Feb. 19, 2013

(65) Prior Publication Data

US 2013/0215175 A1   Aug. 22, 2013

(30) Foreign Application Priority Data

Feb. 21, 2012 (JP) .................. 2012-035670
Jan. 23, 2013 (JP) .................. 2013-010566

(51) Int. Cl.
*C09D 11/02* (2014.01)

(52) U.S. Cl.
USPC ..................... 106/31.86; 347/100

(58) Field of Classification Search
USPC .............................. 106/31.86
See application file for complete search history.

(56) References Cited

U.S. PATENT DOCUMENTS

| | | | | |
|---|---|---|---|---|
| 5,656,071 | A * | 8/1997 | Kappele et al. | 106/31.76 |
| 5,667,569 | A | 9/1997 | Fujioka | |
| 5,772,746 | A | 6/1998 | Sawada et al. | |
| 2013/0027485 | A1 * | 1/2013 | Ozawa | 347/100 |

FOREIGN PATENT DOCUMENTS

| | | |
|---|---|---|
| JP | H09-012945 A | 1/1997 |
| JP | H09-268266 A | 10/1997 |

* cited by examiner

*Primary Examiner* — Veronica F Faison
(74) *Attorney, Agent, or Firm* — Knobbe Martens Olson & Bear LLP

(57) ABSTRACT

An ink for ink-jet recording apparatuses includes water, a pigment dispersion, a humectant, and a penetrating agent. The ink includes glycerin of from 5% to 9% by mass and 1,3-propanediol and/or 1,4-butanediol of from 30% to 45% by mass as the humectant. The ink also includes a C1-C4 monoalkyl ether of polyhydric alcohol of from 2.0% to 4.5% by mass as the penetrating agent.

4 Claims, 5 Drawing Sheets

INK FOR INK-JET RECORDING APPARATUSES AND IMAGE FORMING METHOD

INCORPORATION BY REFERENCE

This application is based upon and claims the benefit of priority from the corresponding Japanese Patent Application Nos. 2012-035670 and 2013-010566, respectively filed in the Japan Patent Office on Feb. 21, 2012, and Jan. 23, 2013, the entire contents of which are incorporated herein by reference.

FIELD

The present disclosure relates to an ink for ink-jet recording apparatuses and an image forming method.

BACKGROUND

In recent years, highly precise and fine image quality comparative to silver salt photography can be taken along with rapid progress of recording technology; therefore, ink-jet recording apparatuses for forming images using an ink-jet recording system have been widely used as image forming apparatuses.

Concerning these ink-jet recording apparatuses, there is a strong desire to further increase image forming speed while maintaining image quality thereof. An ink is therefore required that can be stably ejected from nozzles of recording heads without clogging the nozzles even when forming images at higher speed. An ink is also required that can promptly penetrate into recording media in order to prevent ink adhesion to discharge rollers, i.e. offset, which occurs when recording media are conveyed by discharge rollers before the ink has penetrated into the recording media.

From such a circumstance, an ink-jet recording liquid has been proposed that contains glycerin and 1,3-propanediol in a certain proportion and that allegedly provides stable ejection.

A water-based ink has also been proposed that contains a polyhydric alcohol monoalkyl ether having a vapor pressure of 0.1 mmHg or lower at 20° C. and that can allegedly effectively increase an ink penetration speed into recording media.

However, there may arise a case in the ink-jet recording liquid such that ejection of droplets of the ink-jet recording liquid cannot be maintained in a proper condition depending on the content ratio between glycerin and 1,3-propanediol when allowing recording heads filled with the ink-jet recording liquid to stand without caps for a long time. There are also problems in the ink-jet recording liquid in that it is difficult to form images with a desired image density or to maintain ejection of droplets of the ink-jet recording liquid from recording heads in a proper condition when forming images for a long time.

There is also a problem in the water-based ink described above in that viscosity of the ink and dispersion condition of pigments are considerably changed after exposing the ink to a high-temperature environment for a long time although permeability of the ink into recording media can be sufficiently enhanced.

SUMMARY

An ink for ink-jet recording apparatuses according to an aspect of the present disclosure includes at least water, a pigment dispersion, a humectant, and a penetrating agent. The humectant contains glycerin, and 1,3-propanediol and/or 1,4-butanediol. The content of glycerin is from 5% to 9% by mass in the ink. The total content of 1,3-propanediol and/or 1,4-butanediol is from 30% to 45% by mass in the ink. The penetrating agent is a C1-C4 monoalkyl ether of polyhydric alcohol. The content of the C1-C4 monoalkyl ether of polyhydric alcohol is from 2.0% to 4.5% by mass in the ink.

In an image forming method according to another aspect of the present disclosure, images are formed using an ink-jet recording apparatus by the ink for ink-jet recording apparatuses described above.

DETAILED DESCRIPTION OF EMBODIMENTS

Figure 1:
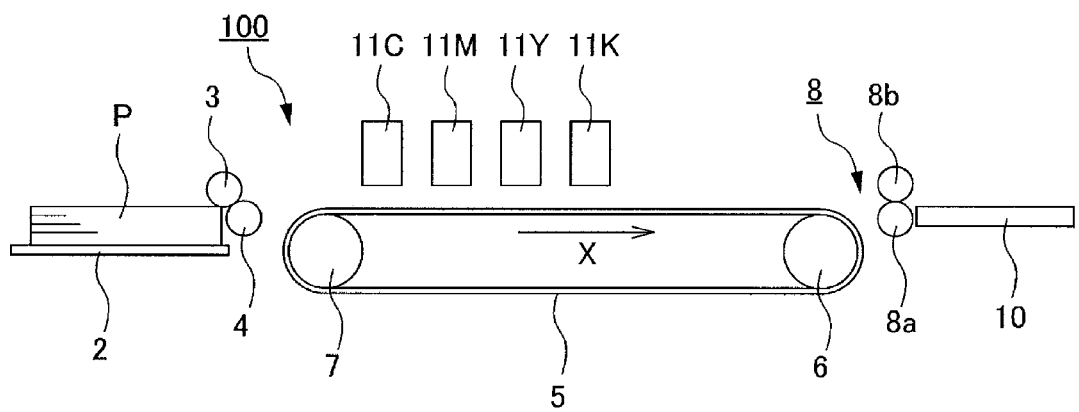
FIG. 1 shows a configuration of an ink-jet recording apparatus that employs a line head-type recording system.

The present disclosure is explained in detail with respect to embodiments below; however, the present disclosure is not limited at all to the embodiments below and may be carried out with appropriately making a change within the purpose of the present disclosure. In addition, explanation may be occasionally omitted with respect to duplicated matters; this does not however limit the gist of the present disclosure.

First Embodiment

An ink for ink-jet recording apparatuses of the first embodiment (hereinafter, also simply referred to as "ink") contains water, a pigment dispersion, a humectant, and a penetrating agent. The ink contains glycerin of from 5% to 9% by mass and 1,3-propanediol and/or 1,4-butanediol of from 30% to 45% by mass in the ink as the humectant. The ink contains a C1-C4 monoalkyl ether of polyhydric alcohol of from 2.0% to 4.5% by mass in the ink as the penetrating agent.

The ink may also contain a dissolution stabilizer that stabilizes the state of components dissolved in the ink, in addition to the water, the pigment, the resin, the humectant, and the penetrating agent, as necessary. The pigment and the resin are included as the pigment dispersion in the ink. The water, the pigment dispersion, the pigment and the resin in the pigment dispersion, the humectant, the penetrating agent, and the dissolution stabilizer, which are essential or optional components in the ink for ink-jet recording apparatuses, as well as a method of producing the ink for ink-jet recording apparatuses are explained in order below.

Water

The ink for ink-jet recording apparatuses of the present disclosure is a water-based ink, and thus it necessarily contains water. The water in the ink is not particularly limited within a range not inhibiting the purpose of the present disclosure and water with a desired purity may be appropriately selected and employed from waters used in the production of conventional water-based inks. The content of the water in the ink for ink-jet recording apparatuses of the present disclosure is not particularly limited within a range not inhibiting the purpose of the present disclosure. The content of the water is appropriately adjusted depending on the amounts of other components used, as described later. Typically, the content of the water in the ink is preferably from 20% to 70% by mass and more preferably from 30% to 60% by mass based on the total mass of the ink.

Pigment Dispersion

The ink for ink-jet recording apparatuses of the present disclosure contains a pigment dispersion that contains the pigment as a colorant and the resin.

(Pigment)

The pigment in the pigment dispersion is not particularly limited within a range not inhibiting the purpose of the present disclosure, and it may be appropriately selected and used from pigments used as a colorant in conventional inks for ink-jet recording apparatuses. Specific examples of the pigment may be exemplified by yellow pigments such as C.I. pigment yellows 74, 93, 95, 109, 110, 120, 128, 138, 139, 151, 154, 155, 173, 180, 185, and 193; orange pigments such as C.I. pigment oranges 34, 36, 43, 61, 63, and 71; red pigments such as C.I. pigment reds 122 and 202; blue pigments such as C.I. pigment blues 15 and 15:3; violet pigments such as C.I. pigment violets 19, 23, and 33; and black pigments such as C.I. pigment black 7.

The amount of the pigment used is not particularly limited within a range not inhibiting the purpose of the present disclosure. Specifically, it is preferably from 4% to 8% by mass based on the total mass of the ink. In a case of using an ink prepared from a pigment dispersion where the amount of the pigment is excessively small, it may be difficult to obtain an image having a desired image density. In a case of using an ink prepared from a pigment dispersion where the amount of the pigment is excessively large, flowability of the ink may be impaired to result in resistance to obtain images with a desired image density or permeability of the ink into recording media may be impaired to result in occurrences of offset.

Volume average particle diameter of the pigment in the pigment dispersion is preferably from 30 nm to 200 nm and more preferably from 70 nm to 130 nm from the viewpoint of ink properties such as color density, hue, and ink stability. The volume average particle diameter of the pigment may be controlled by adjusting a particle diameter of beads, processing time, etc. in a process of kneading the pigment and the resin. When using an ink prepared from the pigment dispersion containing a pigment having an excessively small volume average particle diameter, the image density of resulting images may be lower than a desired value; and when using an ink prepared from the pigment dispersion containing a pigment having an excessively large volume average particle diameter, clogging of nozzles for ejecting the ink may occur and ejection property of the ink may degrade. The volume average particle diameter of the pigment can be measured using a device such as a dynamic light scattering particle size distribution analyzer (by Sysmex Co.) for a sample which is prepared by diluting the pigment dispersion to 300 times with ion-exchange water.

(Resin)

The resin in the pigment dispersion is not particularly limited within a range not inhibiting the purpose of the present disclosure, and it can be appropriately selected and used from various resins used in the production of conventional pigment dispersions. Specific examples of preferable resins may be exemplified by styrene-acrylic acid-acrylic acid alkyl ester copolymers, styrene-methacrylic acid-methacrylic acid alkyl ester-acrylic acid alkyl ester copolymers, styrene-acrylic acid copolymers, styrene-maleic acid copolymers, styrene-maleic acid-acrylic acid alkyl ester copolymers, styrene-methacrylic acid copolymers, styrene-methacrylic acid alkyl ester copolymers, styrene-maleic acid half ester copolymers, vinylnaphthalene-acrylic acid copolymers, and vinylnaphthalene-maleic acid copolymers. Among these resins, in view of easy preparation and excellent effects in dispersing pigments, preferable are styrene-acrylic resins that include a unit derived from styrene and a unit derived from acrylic acid, methacrylic acid, acrylic acid ester, or methacrylic acid ester such as styrene-acrylic acid-acrylic acid alkyl ester copolymers, styrene-methacrylic acid-methacrylic acid alkyl ester-acrylic acid alkyl ester copolymers, styrene-acrylic acid copolymers, styrene-maleic acid-acrylic acid alkyl ester copolymers, styrene-methacrylic acid copolymers, and styrene-methacrylic acid alkyl ester copolymers.

The weight average molecular weight (Mw) of the resin, used for preparing the pigment dispersion, is not particularly limited within a range not inhibiting the purpose of the present disclosure; it is preferably from 10,000 to 160,000. In a case of using an ink prepared from a pigment dispersion containing a resin having an excessively small molecular mass, it is difficult to form images with a desired image density when forming images on recording media. When using an ink prepared from a pigment dispersion containing a resin having an excessively large molecular mass, the viscosity of the ink is higher and thus the viscosity of the ink tends to increase still further under the influence of a cause such as vaporization of solvent; therefore, ejection failure of the ink from nozzles is likely to occur. For this reason, it is difficult to form good images when using the ink prepared from a pigment dispersion containing the resin having an excessively large molecular mass. The molecular mass of the resin can be controlled by a conventional method to adjust polymerization conditions such as an amount of polymerization initiator used, polymerization temperature, and polymerization time when producing the resin through a polymerization reaction. The weight average molecular weight (Mw) of the resin in the pigment dispersion can be measured using gel filtration chromatography.

The acid value of the resin used in the preparation of the pigment dispersion is preferably from 50 to 200 mg KOH/g. In cases of using an ink prepared from the pigment dispersion containing a resin of which the acid value is excessively small, the dispersibility of the pigment in the pigment dispersion tends to be poor and thus it becomes difficult to prepare fine particles of the pigment. For this reason, the resulting images may not exhibit favorable colorability or chromogenic property. In cases of using an ink prepared from the pigment dispersion containing a resin of which the acid value of the resin is excessively large, storage stability of the ink is likely to be poor. The acid value of the resin can be controlled by appropriately adjusting the amount of monomers such as acrylic acid and methacrylic acid having an acidic functional group when synthesizing the resin. Specifically, the acid value of the resin can be raised by increasing the amount of monomers having an acidic functional group.

The amount of the resin used for preparing the pigment dispersion is not particularly limited within a range not inhibiting the purpose of the present disclosure. Typically, the resin is used in an amount of from 15 to 100 parts by mass based on 100 parts by mass of the pigment.

(Method of Preparing Pigment Dispersion)

The method of preparing the pigment dispersion containing the pigment and the resin is not particularly limited within a range not inhibiting the purpose of the present disclosure, and it can be appropriately selected from conventional methods. A favorable method may be exemplified by a method where the pigment and the resin are kneaded in a suitable liquid medium like water using a wet-type media disperser such as a Nano Grain Mill (by Asada Tekko), an MSC Mill (by Mitsui Mining Co.), and a Dyno Mill (by Shinmaru Enterprises Co.) to prepare the pigment dispersion. Beads with a small diameter are used in the processing where the wet-type media disperser is employed. The particle diameter of the beads is not particularly limited; typically, the particle diameter is from 0.5 mm to 1.0 mm. The material of the beads is not particularly limited, and a hard material such as zirconia may be used.

The amount of liquid medium used to prepare the pigment dispersion is not particularly limited as long as the pigment and resin can be favorably kneaded. Typically, the mass amount of liquid medium used is preferably from 1 to 10 times and more preferably from 2 to 8 times based on the total mass of the pigment and the resin.

Humectant

The humectant is a component for stabilizing the viscosity of the ink by suppressing vaporization of liquid components from the ink. The ink for ink-jet recording apparatuses includes the humectant that contains glycerin, and 1,3-propanediol and/or 1,4-butanediol. By way of including glycerin, and 1,3-propanediol and/or 1,4-butanediol, even when forming images using a recording head having been filled with the ink out of use without a cap for a long time, ink droplets can be properly ejected from the recording head.

The content of glycerin is from 5% to 9% by mass in the ink. The total content of 1,3-propanediol and/or 1,4-butanediol is from 30% to 45% by mass in the ink. When using an ink with an excessively small content of glycerin, moisture-retaining property of the ink is poor and thus the solvent tends to evaporate. Therefore, the ink tends to thicken or be solidified near ink ejection holes of nozzles. Consequently, ejection failure of ink droplets from recording heads is likely to occur when forming images after allowing recording heads filled with the ink to stand without caps for a long time. On the other hand, when using an ink with an excessively large content of glycerin, the viscosity of the ink tends to be high although the moisture-retaining property of the ink is high. Consequently, ejection failure of ink droplets from recording heads is likely to occur when forming images for a long time.

When using an ink with an excessively small content of 1,3-propanediol and/or 1,4-butanediol, moisture-retaining property of the ink is poor and the solvent tends to evaporate. Consequently, ejection failure of ink droplets from recording heads is likely to occur when forming images for a long time. Furthermore, the ink tends to thicken or be solidified near ink ejection holes of nozzles due to evaporation of the solvent. Consequently, ejection failure of ink droplets from recording heads is likely to occur when forming images after allowing recording heads filled with the ink to stand without caps for a long time.

When using an ink with an excessively large content of 1,3-propanediol and/or 1,4-butanediol, the ink tends to be thick and is also likely to thicken still further with time. Consequently, ejection failure of ink droplets from recording heads is likely to occur when forming images after allowing recording heads filled with the ink to stand without caps for a long time. Additionally, in cases of using an ink with an excessively large content of 1,4-butanediol, ejection failure of ink droplets from recording heads is likely to occur when forming images after allowing recording heads filled with the ink to stand without caps for a long time.

The ink for ink-jet recording apparatuses may contain a humectant other than glycerin, 1,3-propanediol, and 1,4-butanediol within a range not inhibiting the purpose of the present disclosure. Specific examples of the humectant, suited to the ink other than glycerin, 1,3-propanediol, and 1,4-butanediol, may be exemplified by polyethylene glycol, polypropylene glycol, ethylene glycol, propylene glycol, butylene glycol, diethylene glycol, dipropylene glycol, triethylene glycol, tripropylene glycol, 1,2,6-hexanetriol, thiodigylcol, 1,3-butanediol, and 1,5-pentanediol. These humectants may be used alone or in a combination of two or more.

The total amount of the humectants is preferably from 35% to 60% by mass and more preferably 35% to 55% by mass based on the total mass of the ink. The content of glycerin, and 1,3-propanediol and/or 1,4-butanediol in the humectant is not particularly limited within a range not inhibiting the purpose of the present disclosure; the content is preferably 80% by mass or higher, more preferably 90% or higher, and particularly preferably 100% by mass based on the humectant.

Penetrating Agent

The ink for ink-jet recording apparatuses contains the penetrating agent in order to enhance permeability of the ink into recording media. The penetrating agent is a C1-C4 monoalkyl ether of polyhydric alcohol. By use of the C1-C4 monoalkyl ether of polyhydric alcohol as the penetrating agent, images with a desired image density can be obtained when forming images, ink droplets can be properly ejected from recording heads when forming images even after allowing recording heads filled with the ink to stand without caps for a long time, and viscosity change of the ink and conditional change of dispersed pigment can be suppressed even after the ink is exposed to a high-temperature environment for a long time.

The content of the C1-C4 monoalkyl ether of polyhydric alcohol is from 2.0% to 4.5% by mass in the ink. When using an ink with an excessively small content of the C1-C4 monoalkyl ether of polyhydric alcohol, the permeability of the ink into recording media is likely to be poor, it is therefore difficult to form images with a desired image density when forming images. When using an ink with an excessively large content of the C1-C4 monoalkyl ether of polyhydric alcohol, it is difficult to suppress the viscosity change of the ink and conditional change of dispersed pigment when the ink is exposed to a high-temperature environment for a long time. Besides, ejection failure of ink droplets from recording heads is likely to occur when forming images after allowing recording heads filled with the ink to stand without caps for a long time.

Specific examples of the C1-C4 monoalkyl ether of polyhydric alcohol may be exemplified by triethylene glycol monobutyl ether, diethylene glycol monopropyl ether, triethylene glycol monoethyl ether, triethylene glycol monomethyl ether, diethylene glycol monomethyl ether, diethylene glycol monoisopropyl ether, and diethylene glycol monoisobutyl ether. Among these, one or more selected from the group consisting of triethylene glycol monobutyl ether, triethylene glycol monomethyl ether, diethylene glycol monomethyl ether, diethylene glycol monoisopropyl ether, and diethylene glycol monoisobutyl ether are preferable since these are excellent in permeability into recording media such as paper, moisture-retaining property, and storage stability.

The ink for ink-jet recording apparatuses may contain an organic solvent other than the penetrating agents described above within a range not inhibiting the purpose of the present disclosure in order to tailor permeability of the ink into recording media. Specific examples of the organic solvent other than the penetrating agents may be exemplified by long-chain alcohols having an alkyl group of from 6 to 12 carbon atoms and polyhydric alcohols having an alkyl group of from 6 to 9 carbon atoms. These organic solvents may be used alone or in a combination of two or more. When an organic solvent other than the penetrating agents is included in the ink, the content of the organic solvent is preferably from 2% to 8% by mass based on the total mass of the ink.

Dissolution Stabilizer

The dissolution stabilizer is a component that stabilizes a state of dissolved ink by compatibilizing the components in the ink. Specific examples of the dissolution stabilizer may be exemplified by 2-pyrrolidone, N-methyl-2-pyrrolidone, and γ-butyrolactone. These dissolution stabilizers may be used in a combination of two or more. When the ink contains the dissolution stabilizer, the content of the dissolution stabilizer is preferably from 1% to 20% by mass and more preferably from 3% to 15% by mass based on the total mass of the ink.

Method of Producing Ink for Ink-jet Recording Apparatuses

The method of producing the ink for ink-jet recording apparatuses of the present disclosure is not particularly limited as long as capable of uniformly mixing water, the pigment dispersion, the humectant, and the penetrating agent after adding an optional dissolution stabilizer thereto. A specific example of the method for producing the ink for ink-jet recording apparatuses may be exemplified by a method of uniformly mixing every component of the ink by using a mixer and then removing foreign matter and coarse particles by use of a filter with a pore size of 10 μm or less. In the processes of producing the ink for ink-jet recording apparatuses, organic solvents of other liquid components such as a dissolution stabilizer or various conventional additives that are added to inks for ink-jet recording apparatuses such as surfactants, anti-oxidants, viscosity modifiers, pH adjusters, and antibacterial/antifungal agents may be added to the water, the pigment dispersion, the humectant, and the penetrating agent, as necessary.

By use of the ink for ink-jet recording apparatuses according to the first embodiment explained above, when forming images for a long time or even when forming images after allowing recording heads filled with the ink to stand without caps for a long time, the condition of ink droplets ejected from recording heads can be properly maintained and images with a desired image density can be obtained, and also the viscosity change of the ink and conditional change of dispersed pigment can be suppressed even after exposing the ink to a high-temperature environment for a long time. For this reason, the ink for ink-jet recording apparatuses according to the first embodiment can be properly used in various ink-jet recording apparatuses.

Second Embodiment

The second embodiment relates to an image forming method for forming an image using the ink for ink-jet recording apparatuses according to the first embodiment by an ink-jet recording apparatus. The recording system of the ink-jet recording apparatus, used in the image forming method according to the second embodiment, is not particularly limited and may be a serial type in which recording is performed while scanning a recording head over a recording medium or a line head-type in which recording is performed using a recording head fixed to an apparatus main body. The recording system of the ink-jet recording apparatus, used in the image forming method according to the second embodiment, is preferably a line head-type from the viewpoint of higher speed in forming images and is more preferably a recording apparatus equipped with a long line head perpendicular to a recording medium conveying direction.

The ink for ink-jet recording apparatuses according to the first embodiment is used in the image forming method according to the second embodiment; therefore, image disarray can be suppressed when forming images after the ink was not ejected for a while from recording heads, and the condition of ink droplets ejected from recording heads can be easily and properly maintained even when forming images after allowing the recording heads filled with the ink to stand without caps for a long time.

Figure 2:
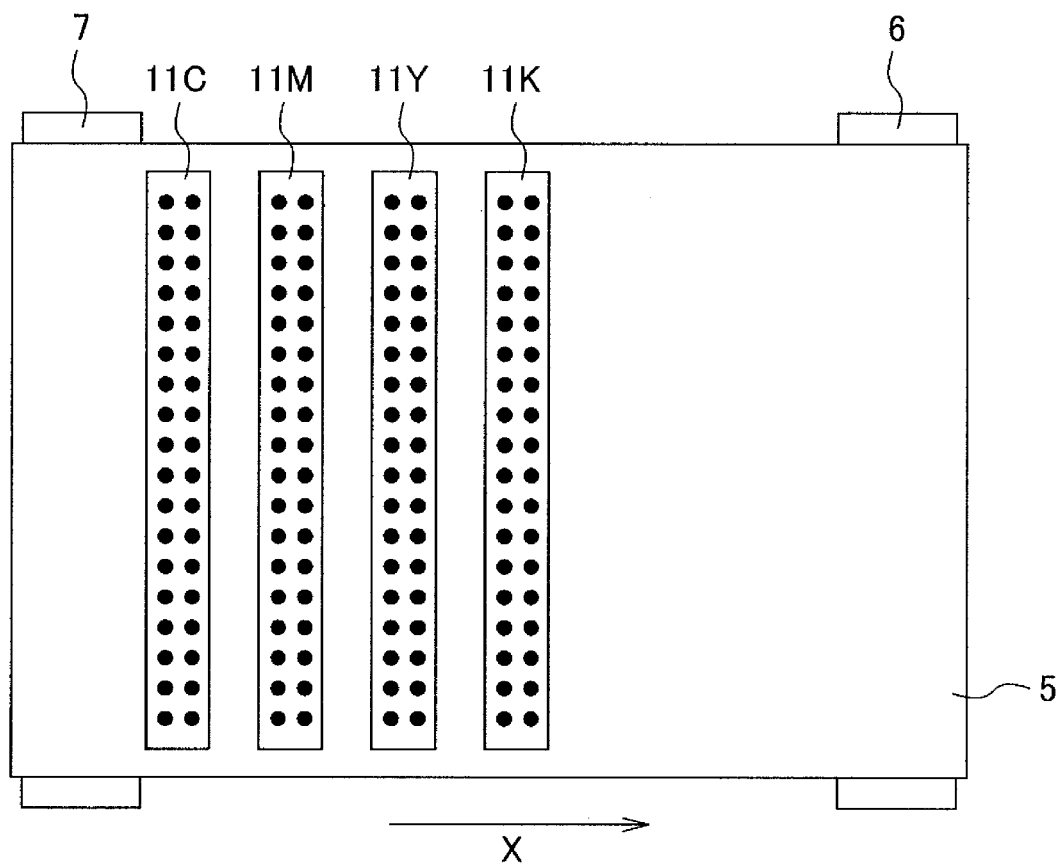
FIG. 2 is a view in which a conveyor belt of the ink-jet recording apparatus shown in FIG. 1 is viewed from above.

The image forming method of the second embodiment is explained with respect to the case of using a line head-type ink-jet recording apparatus where a recording paper is used as a recording medium with reference to figures below. FIG. 1 is a cross-sectional view showing the configuration of a line head-type ink-jet recording apparatus; and FIG. 2 is a view of a conveyor belt, of the ink-jet recording apparatus shown in FIG. 1, viewed from above.

As shown in FIG. 1, a paper feed tray 2 (paper feed portion), where a recording paper P is stored, is provided on a left side of an ink-jet recording apparatus 100; and there are provided a paper feed roller 3 that feeds and conveys an uppermost recording paper P one by one in sequence to a conveyor belt 5 and a driven roller 4 that pressure-contacts with the paper feed roller 3 and is rotationally driven, at one end of the paper feed tray 2.

The conveyor belt 5 is rotatably arranged at a downstream side in a paper conveying direction X (right side in FIG. 1) of the paper feed roller 3 and the driven roller 4. The conveyor belt 5 is stretched over a belt drive roller 6 that is arranged at the downstream side in the paper conveying direction X and a belt roller 7 that is arranged at an upstream side and driven-rotated with the belt drive roller 6 through the conveyor belt 5, and the recording paper P, supported by the conveyor belt 5, is conveyed to the direction of arrow X by rotationally driving the belt drive roller 6 to the clockwise direction.

The belt drive roller 6 is arranged at a downstream side in the paper conveying direction X, thereby the paper feeding side (upwards in FIG. 1) of the conveyor belt 5 is pulled by the belt drive roller 6. Consequently, belt tension can be applied without slack, and thus the recording paper P can be stably conveyed. A sheet of a dielectric resin is used for the conveyor belt 5, and a structure without seams (seamless) is preferably used.

Furthermore, at the downstream side in the paper conveying direction X of the conveyor belt 5, there are provided a pair of discharge rollers 8 (discharge portion) consisting of a discharge roller 8a that is driven in the clockwise direction to discharge the recoding paper P with a recorded image out of the apparatus main body and a driven roller 8b that is in pressure-contact with the top of the discharge roller 8a and is rotationally driven. A paper ejection tray 10, on which the recording paper P discharged out of the apparatus main body is stacked, is also provided at the downstream side in the paper conveying direction X of the pair of discharge rollers 8.

Since the driven roller 8b directly contacts the image forming surface of the recording paper P, it is preferable that the material of the surface of the driven roller 8b is a water-repellent material. Adhesion of the ink, which has not penetrated into the recording paper, to the driven roller 8b can be suppressed by making the surface of the driven roller 8b from the water-repellent material. Therefore, occurrence of offset can be easily suppressed. The preferable water-repellent material may be exemplified by fluorine resins such as polytetrafluoroethylene (PTFE), tetrafluoroethylene-perfluoroalkyl vinyl ether copolymers, tetrafluoroethylene-hexafluoropropylene copolymers, tetrafluoroethylene-ethylene copolymers, tetrafluoroethylene-vinylidene fluoride copolymers, tetrafluoroethylene-hexafluoropropylene-perfluoroalkyl vinyl ether copolymers, polychlorotrifluoroethylene, chlorotrifluoroethylene-ethylene copolymers, chlorotrifluoroethylene-vinylidene fluoride copolymers, polyvinylidene fluoride and polyvinyl fluoride. Similarly to the driven roller 8b, the surface of the components directly contacting the image forming surface of the recording paper P is preferably made of the water-repellent material.

Above the conveyor belt 5, there are provided line heads 11C, 11M, 11Y, and 11K which are supported at a height such that a predetermined interval is maintained from the top surface of the conveyor belt 5 and which perform recording of images on the recording paper P conveyed on the conveyor belt 5.

Colored inks of four different colors (cyan, magenta, yellow, and black) are filled in these line heads 11C to 11K respectively, and color images are formed on the recording paper P by ejecting the respective color inks from each of the line heads 11C to 11K.

In order to downsize the apparatus, preferably, the period starting from the time when the ink droplets ejected from each of the line heads 11C to 11K have landed on the recording paper P until the time when the ink landing locations on the recording paper P have reached to the discharge portion 8 is within one second. Even in a case of setting the period to within one second, the effect to suppress the occurrence of offset when forming images rapidly can be sufficiently exerted by using the ink according to the first embodiment.

The ink amount of one or more colors that has been ejected from line heads 11C to 11K and has landed on the recording paper P is also not particularly limited and may be adjusted to an amount where images with a desired image density can be formed and offset is unlikely to occur.

As shown in FIG. 2, these line heads 11C to 11K include nozzle arrays where a plurality of nozzles are arranged in a direction perpendicular to the paper conveying direction X (vertical direction in FIG. 2) and have a recording area of at least the width of the recording paper P, thereby allowing to form one-line images at once on the recording paper P conveyed by the conveying belt 5.

Here, in the line head-type ink-jet recording apparatus of this embodiment, the line heads are configured to have a recording area of at least the width of the recording paper P by way of aligning a plurality of nozzles in the longitudinal direction of a long head body that is no shorter than the width of the conveyor belt 5. In this connection, the line heads may be configured such that two or more short head units, each having two or more nozzles, are aligned in the width direction of the conveyor belt 5 to record images over the entire width of the recording paper P.

Various systems may also be employed for the ink ejection system of the line heads 11C to 11K such as a piezoelectric element system for ejecting ink droplets using pressure occurring in liquid chambers of the line heads 11C to 11K by controlling a voltage applied to a piezoelectric element (piezo element, shown in FIG. 3A), a thermal ink-jet system for causing air bubbles to increase in pressure using a heating element to eject ink droplets, and the like. The ink ejection system is preferably the piezoelectric element system since the control of the ejected amount is easy.

In particular, a pull-shot system is Preferably employed in the line heads 11C to 11K of the ink-jet recording apparatus used for the image forming method according to the second embodiment of the present disclosure, in which a pressure in a liquid chamber is reduced by controlling a voltage applied to a piezoelectric element, then the pressure in the liquid chamber is returned, thereby ejecting the ink. When the ink is ejected using the pull-shot system, the size of dot diameter formed on recording media, i.e. the amount of ejected ink can be easily adjusted. It is therefore easy to express multi-stage graduation for the images formed on recording media. The process of ink ejection using the pull-shot system is explained below.

Figure 3A:
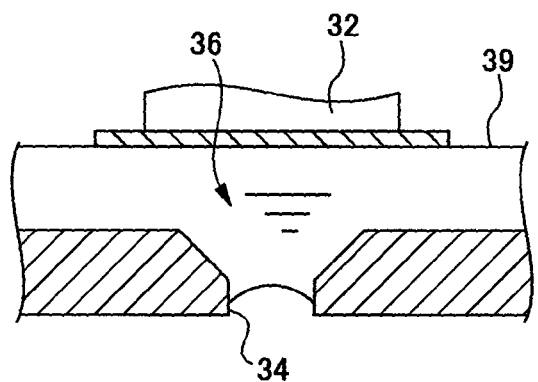
FIG. 3A shows a view showing a nozzle of the line head.
Figure 3B:
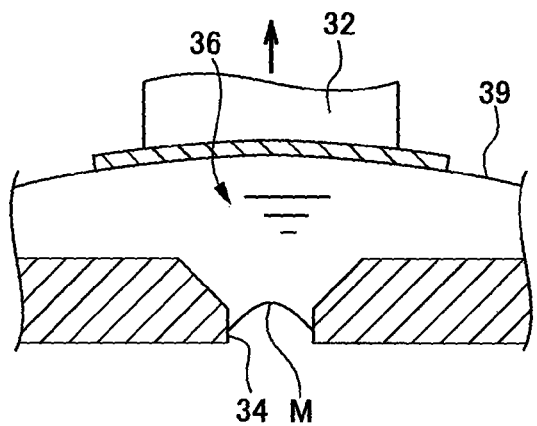
FIG. 3B shows a view showing shrinkage of a piezoelectric element by application of a drive voltage.
Figure 3C:
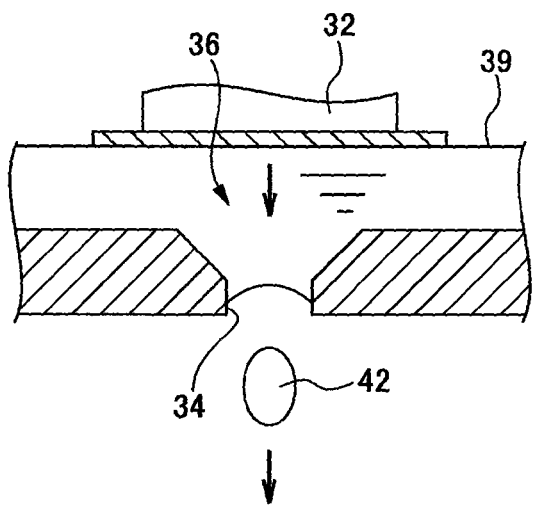
FIG. 3C shows a view showing ejection of a ink droplet from an ink ejection hole.

FIGS. 3A to 3C shows the process of ink ejection using the pull-shot system. As shown in FIG. 3A, the line heads 11C to 11K are provided with a piezoelectric element 32, an ink ejection hole 34, and a liquid chamber 36 per nozzle. In the case of ejecting the ink using the pull-shot system, starting from the state of FIG. 3A where no drive voltage is applied to the piezoelectric element 32, a drive voltage is applied to the piezoelectric element 32 to shrink the piezoelectric element 32 as shown in FIG. 3B. At this time, it is preferred that the pressure in the liquid chamber 36 is slowly reduced by gradually increasing the drive voltage to gradually shrink the piezoelectric element 32. Through these motions, the liquid chamber 36 can be expanded while preventing a residual air bubble in the liquid chamber 36 caused by excessively pulling inwards the meniscus M at the ink ejection hole 34. Then, the application of the drive voltage to the piezoelectric element 32 is finished to return the piezoelectric element 32 to its original state as shown in FIG. 3C, thereby a minute amount of ink near the ink ejection hole 34 can be ejected as an ink droplet 42.

It is also preferred in the image forming method according to the second embodiment of the present disclosure that the ink in the liquid chamber 36 of the line heads 11C to 11K of the ink-jet recording apparatus is warmed to a temperature somewhat higher than normal room temperature of about 20° C. More specifically, the ink is preferably warmed from 32° C. to 35° C. The method of warming the ink in the liquid chamber 36 is not particularly limited as long as not inhibiting the purpose of the present disclosure. The method of warming the ink in the liquid chamber 36 may be exemplified by a method in which a heater is provided to a common ink chamber (not shown) per each color of line heads 11C to 11K to warm the ink in the common ink chamber, a method in which a heater is provided to the liquid chamber 36 per each nozzle of the line heads 11C to 11K to warm the ink in the liquid chamber 36 using the heater, and the like.

By way of warming the ink in the liquid chamber 36 to a temperature somewhat higher than normal room temperature, the condition of ink droplets ejected from line heads 11C to 11K can be properly maintained even when forming images after allowing the line heads 11C to 11K filled with the ink to stand without caps for a long time while suppressing the viscosity change of the ink and conditional change of dispersed pigment, thereby images with a desired image density can be formed.

Figure 4:
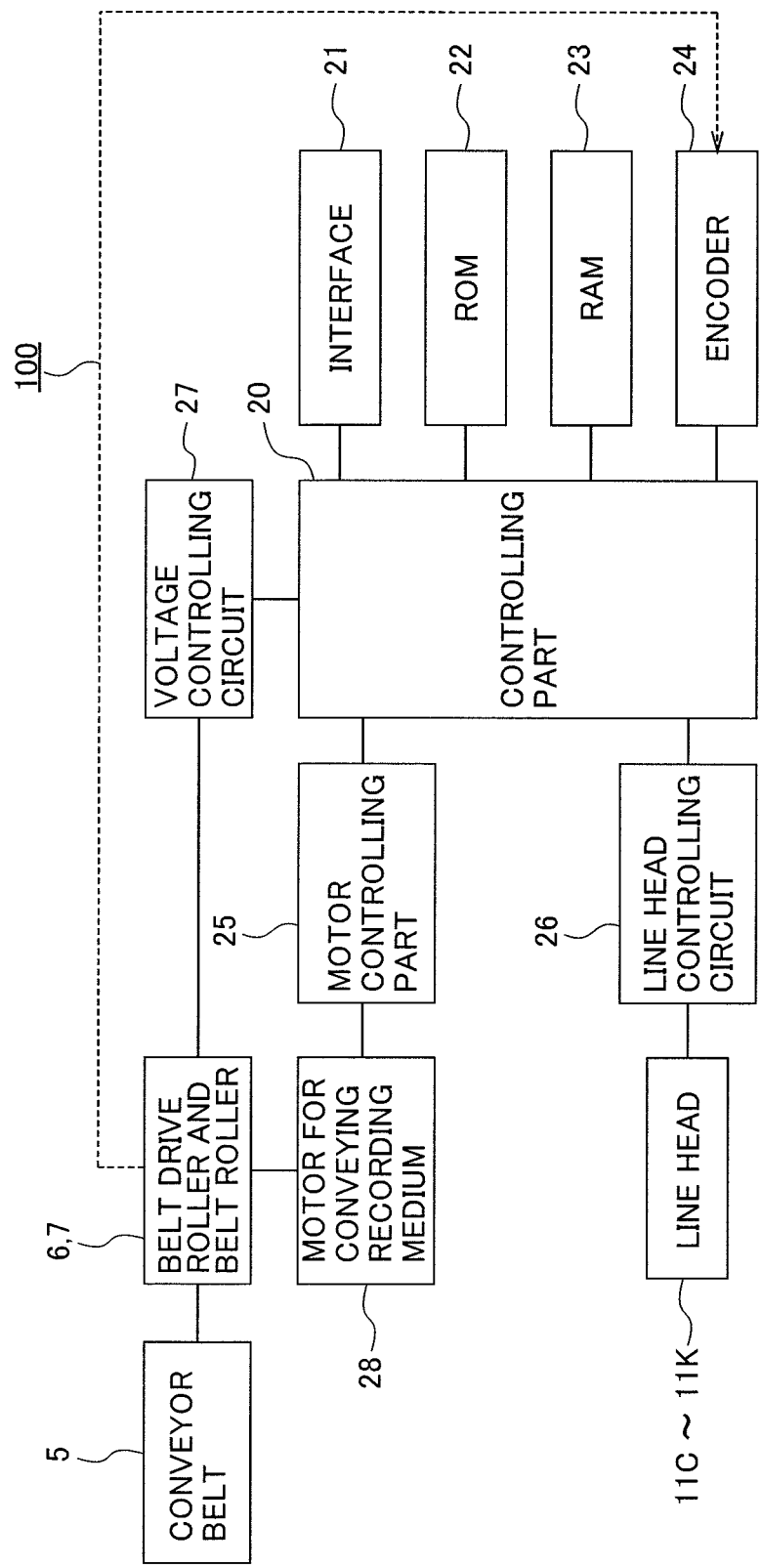
FIG. 4 is a block view showing a configuration of a line head-type ink-jet recording apparatus.

FIG. 4 is a block view showing a configuration of an ink-jet recording apparatus that employs a line head-type recording system. The portions common between FIG. 1 and FIG. 2 are marked with an identical symbol and duplicated explanations thereof are omitted. The ink-jet recording apparatus 100 is equipped with a controlling part 20; and an interface 21, a ROM 22, a RAM 23, an encoder 24, a motor controlling circuit 25, a line head controlling circuit 26, and a voltage controlling circuit 27 are connected to the controlling part 20.

The interface 21 transmits and receives data between a host device such as a personal computer (not shown). The controlling part 20 converts an image signal received via the interface 21 into image data by conducting magnification-changing processing or gradation processing as necessary. Then control signals are output to various controlling circuits described later.

The ROM 22 stores a program such as a control program for forming an image by driving the line heads 11C to 11K. The RAM 23 stores image data, having been magnification-changing processed or gradation processed by the controlling part 20, in a predetermined region.

The encoder 24 is connected to the belt drive roller 6 on a paper ejection side of driving the conveyor belt 5, and outputs a pulse train depending on the rotational displacement amount of the rotation axis of the belt drive roller 6. The controlling part 20 calculates the amount of rotation by counting the number of pulses sent from the encoder 24 to confirm the feed amount of the recording paper P (position of recording paper P). The controlling part 20 outputs a control signal to the motor controlling circuit 25 and line head controlling circuit 26 based on the signal from the encoder 24.

The motor controlling circuit 25 drives a motor for conveying recording medium 28 based on the output signal from the controlling part 20. The belt drive roller 6 is rotated by driving the motor for conveying recording medium 28, and the conveyor belt 5 is rotated in the clockwise direction of FIG. 1 to convey the recording paper P to the direction of arrow X.

The line head controlling circuit 26 transfers image data stored in the RAM 23 to the line heads 11C to 11k based on the output signal from the controlling part 20, and controls the ink ejection from the line heads 11C to 11K based on the transferred image data. Image formation on the recording paper P is performed according to the control described above as well as the conveyance control of the recording paper P through the conveyor belt 5 driven by the motor for conveying recording medium 28. When the line heads 11C to 11K are also equipped with heaters for warming the ink in the liquid chamber 36 from 32° C. to 35° C., the line head controlling circuit 26 controls the temperature of the heater based on an output signal of the controlling part 20. It is preferred that the line heads 11C to 11K are further equipped with temperature sensors. In such a case, the line head controlling circuit 26 can control the temperature of the heater while detecting the temperature of the ink using the temperature sensor.

The voltage controlling circuit 27 produces an alternating electric field by applying a voltage to the belt roller 7 on the paper feed side based on the output signal from the controlling part 20, thereby statically attracting the recording paper P to the conveyor belt 5. The static attraction is released by grounding the belt roller 7 or belt drive roller 6 based on the output signal from the controlling part 20. Here, the voltage is applied to the belt roller 7 on the paper feed side, but the voltage may be applied to the belt drive roller 6 on the paper ejection side.

A method of forming dots using the line head-type ink-jet recording apparatus is specifically explained with reference to FIG. 5. Among the line heads 11C to 11K shown in FIGS. 1 and 2, the line head 11C is explained as an example with reference to FIG. 5; and other line heads 11M to 11K can be explained fairly similarly thereto.

Figure 5:
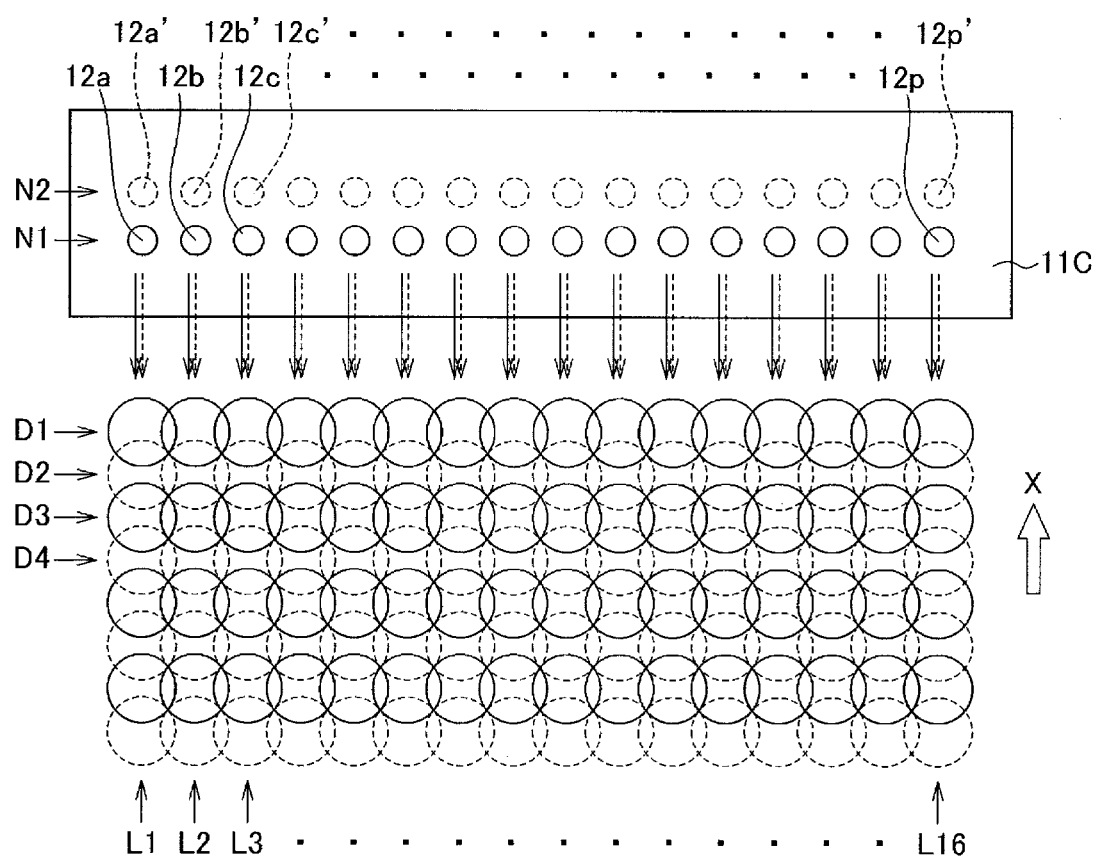
FIG. 5 is a plain view showing a line head used in a line head-type ink-jet recording apparatus and a part of dot lines formed on a recording paper.

As shown in FIG. 5, in the line head 11C, the nozzle arrays N1 and N2 consisting of a plurality of nozzles are arranged in parallel to the conveying direction (direction of arrow X) of recording paper P. That is, a total of two nozzles are provided to each of the nozzle arrays N1 and N2 (nozzles 12a and 12a' corresponding to a dot array L1) as the nozzles that form dot arrays in the paper conveying direction X. Here, for convenience of explanation, although only the 16 nozzles of 12a to 12p and 12a' to 12p' corresponding to the dot arrays L1 to L16 are described among the nozzles of the nozzle arrays N1 and N2; actually, still more nozzles are arranged in a direction orthogonal to the paper conveying direction X.

Images are formed on the recording paper P as a recording medium using the nozzle arrays N1 and N2 in series. After forming the dot array D1 of one line in the width direction (left-right direction in FIG. 5) of the recording paper P by ejecting ink droplets from the nozzle array N1 (solid arrow in FIG. 5) while moving the recording paper P in the paper conveying direction X, a subsequent dot array D2 of one line is formed by ejecting ink droplets from the nozzle array N2 (dotted arrow in FIG. 5), and then a subsequent dot array D3 of one line is further formed by ejecting ink droplets from the nozzle array N1. Thereafter, dot arrays D4 and the followings are similarly formed by alternately using the nozzle arrays N1 and N2.

In accordance with the image forming method of the second embodiment described above, when forming images for a long time or even when forming images after allowing recording heads filled with the ink to stand without caps for a long time, the condition of ink droplets ejected from recording heads can be properly maintained and images with a desired image density can be obtained, and also the viscosity change of the ink and conditional change of dispersed pigment can be suppressed even after exposing the ink to a high-temperature environment for a long time. For this reason, the image forming method of the second embodiment can be suitably employed in various ink-jet recording apparatuses.

EXAMPLES

The present disclosure is explained more specifically with reference to examples below. In addition, the present disclosure is not limited to the examples.

Preparation Example 1

(Preparation of Styrene-Acrylic Resin)

A styrene-acrylic resin, used for preparing a pigment dispersion, was produced by a macromonomer synthesis process. Specifically, a stirrer, a nitrogen-introducing tube, a condenser, and a dropping funnel were set to a 1000 mL four-necked flask, and then 100 g of isopropyl alcohol and 300 g of methyl ethyl ketone were added to the flask, followed by heating under reflux while bubbling nitrogen gas. A mixture solution of 30 g of methyl methacrylate, 80 g of styrene, 42 g of butyl acrylate, 9.7 g of methacrylic acid (MAA), and 0.3 g of azobisisobutyronitrile (AIBN) as an initiator was poured into the dropping funnel, and the mixture solution was added dropwise into the solvent in the flask under reflux at 70° C. over about 2 hours. After the dropwise addition, the content of the flask was further heated and refluxed for 6 hours, and then 150 g of methyl ethyl ketone with 0.1 g of AIBN was added dropwise into the flask over 15 minutes. Thereafter, the content of the flask was further heated and refluxed for 6 hours and then methyl ethyl ketone was distilled away, thereby obtaining a styrene-acrylic resin with a molecular mass of 53,000 and an acid value of 60 mg KOH/g.

The weight average molecular weight (Mw) of the obtained resin was determined in accordance with the following conditions using gel filtration chromatography (HLC-8020GPC, by Tosoh Co.). An acid value (mg KOH/g) of the obtained resin was determined by titration.

Measurement Conditions of Weight Average Molecular Weight

Column: TSKgel, Super Multipore HZ-H (4.6 mm ID×15 cm, by Tosoh Co.)
Number of columns: 3
Eluent: tetrahydrofuran
Flow rate: 0.35 mL/min
Amount of injected sample: 10 µL
Measurement temperature: 40° C.
Detector: IR detector A calibration curve was prepared on the basis of 8 types of F-40, F-20, F-4, F-1, A-5000, A-2500, A-1000, and n-propylbenzene selected from reference standards (TSK standard, polystyrene, by Tosoh Co.).

Preparation Example 2

(Preparation of Pigment Dispersion)

P.B-15:3 was used as the cyan pigment.

25% by mass of the pigment, 10% by mass of the styrene-acrylic resin obtained in Preparation Example 1, 0.5% by mass of a surfactant (OLFINE E1010, ethylene oxide adduct of acetylenediol, by Nissin Chemical Industry Co.), and the remaining water based on the total mass of ingredients used in the preparation of the pigment dispersion were introduced into a Dyno Mill (Multipurpose laboratory, vessel volume 0.6 L, by Shinmaru Enterprises Co.). Next, an amount of potassium hydroxide necessary to neutralize the styrene-acrylic resin was added to the Dyno Mill. Then, zirconia beads with a diameter of 0.5 mm as a media equivalent to 70% by volume of the vessel volume were filled into the Dyno Mill, and the pigment and the styrene-acrylic resin were kneaded under the conditions of 10° C., circumferential velocity 8 m/sec, and water-cooling. The styrene-acrylic resin obtained in Preparation Example 1 was neutralized by an aqueous NaOH solution with a neutralization equivalent of 105%. In the calculation, the mass of Na was considered as a mass of resin, and the mass of water in the aqueous NaOH solution and the water formed in the neutralization reaction were considered as a mass of ion exchange water. The obtained pigment dispersion was diluted to 300 times with ion exchange water, and the volume average particle diameter D50 of the pigment was measured by a dynamic light scattering-type particle size distribution analyzer (Zetasizer Nano, by Sysmex Co.); as a result, the volume average particle diameter D50 of the pigment was confirmed to be in the range of from 70 nm to 130 nm.

Examples 1 to 3 and Comparative Examples 1 to 3

24% by mass of the pigment dispersion obtained in Preparation Example 2, 5.0% by mass of 2-pyrrolidone (dissolution stabilizer), 0.5% by mass of OLFINE E1010 (surfactant, ethylene oxide adduct of acetylenediol, by Nissin Chemical Industry Co.), 1.0% by mass of 1,2-octanediol, glycerin of the amounts in Table 1, 35% by mass of 1,3-propanediol, 4.5% by mass of triethylene glycol monobutyl ether, and the remaining ion-exchange water were uniformly mixed by agitating using an agitator (Three-One Motor, BL-600, by AS ONE Co.) at a rotation number of 400 rpm, followed by filtering through a filter with a pore size of 5 μm, thereby obtaining the inks of Examples 1 to 3 and Comparative Examples 1 to 3. Viscosities of the obtained inks were measured at 25° C. and 35° C. using an oscillation-type viscometer (SV-10, by A&D Company, Ltd.) (Table 1).

The inks of Examples 1 to 3 and Comparative Examples 1 to 3 were evaluated with respect to consecutive image forming time, decap property, image density of resulting image, and dispersion stability. Table 1 shows the evaluation results of consecutive image forming time, decap property, image density of resulting image, and dispersion stability of the inks of Examples 1 to 3 and Comparative Examples 1 to 3.

Method of Evaluating Consecutive Image Forming Time

In the evaluation of the consecutive image forming time, an ink was evaluated as to whether or not normal ejection thereof is possible even after repeating image formation for a long time.

An image forming apparatus (test model, by Kyocera Mita Co.) with a recording head that has a heater capable of warming the ink at a head inside and can detect a temperature of the head inside was used as the evaluation device. The temperature of the ink warmed in the head of the evaluation device was set to 35° C. and the evaluation was performed under an environment of 28° C. and 20% RH. The ink was filled into the recording head, and a redundant liquid out of a nozzle forming surface was scraped off by a wipe blade. The distance between a nozzle surface of the recording head and the recording paper P was fixed to 1 mm, and the conveying speed of the recording paper P from the paper feed portion to the paper discharge portion was set to 847 mm/sec. Plain paper (A4 PPC paper C2, by Fuji Xerox Co.) was used as a recording medium. The ink was ejected such that the amount of the ink ejected from the recording head to the recording medium was 11 pL (per pixel). On a plurality of sheets of the plain paper, a line image (width of one dot×length of the width of the plain paper) vertical to the moving direction of the plain paper was continuously formed per one space of a width of 5 dots (per non-image forming interval). When non-ejection of the ink or displacement (10 μm or more from line) of the ejected ink had been confirmed in the line image on a certain sheet of the plain paper, the time when the sheet just prior to the certain sheet had been discharged was measured (consecutive image forming time). A consecutive image forming time of 60 minutes or longer was determined to be OK (pass), and that of shorter than 60 minutes was determined to be NG (non-pass).

Method of Evaluating Decap Property

In the evaluation of the decap property, an ink was evaluated as to whether or not the ink can be normally ejected from a recording head when forming images after allowing the recording head filled with the ink to stand without a cap for a long time.

The evaluation was performed using the evaluation device and image forming conditions the same as those for evaluating the consecutive image forming time. The ink was filled into the recording head and a set of purge and wipe was carried out 3 times, then the recording head was allowed to stand without a cap for one month. The purge amount was 2 mL per recording head at one time. After still standing for 30 seconds, a solid image of 10 cm×10 cm was formed using plain paper (A4 PPC paper C2, by Fuji Xerox Co.) as a recording medium and setting such that the amount of ejected ink was 11 pL per nozzle of the recording head and per pixel. After forming the solid image on 10 sheets of the plain paper, the recording head was allowed to stand without a cap for 3 hours. After 3 hours, an image of a check pattern, which allows confirmation of an ejection situation of all nozzles of the recording head, was formed on one sheet of the plain paper. A case where ejection of all nozzles could be confirmed was determined to be OK (pass), and a case where non-ejection of the ink or displacement (10 μm or more from line) of the ejected ink was confirmed was determined to be NG (non-pass).

Method of Evaluating Image Density

The evaluation was performed using the evaluation device and conditions the same as those for evaluating the consecutive image forming time except that the evaluation was performed under an environment of 23° C. and 60% RH. A solid image of 10 cm×10 cm was formed using plain paper (A4 PPC paper C2, by Fuji Xerox Co.) as a recording medium and setting such that the amount of ejected ink was 11 pL per nozzle of the recording head and per pixel. After the plain paper with the resulting image was stored for 24 hours under normal temperature and normal humidity, an image density of the image portion was measured using a portable reflection densitometer (RD-19, by GretagMacbeth Co.). An average of image densities at 10 sites in the solid image was defined as the image density. The image density of 1.0 or higher was determined to be OK (pass), and the image density of less than 1.0 was determined to be NG (non-pass).

Method of Evaluating Dispersion Stability

In the evaluation of the dispersion stability, viscosity change of an ink and conditional change of dispersed pigment were evaluated after exposing an ink to a high-temperature environment for a long time. The evaluation result of the dispersion stability is an index that shows a tendency to cause ejection failure of the ink when forming images after the ink was not ejected for a while from recording heads.

The dispersion stability was evaluated by measuring a change rate staring from an initial state until a state of after still standing for one month at 60° C. with respect to a viscosity of an ink and a dispersion diameter of a pigment in accordance with the method below. When both of the viscosity change of an ink and the dispersion diameter change of a pigment were determined to be OK (pass), the dispersion stability was determined to be OK (pass). When at least one of the viscosity change of the ink and the dispersion diameter change of the pigment was determined to be NG (non-pass), the dispersion stability was determined to be NG (non-pass). Here, the dispersion diameter of the pigment indicates an average particle diameter measured for pigment particles dispersed in a liquid.

(Method of Measuring Viscosity Change Rate)

An ink of about 250 mL was poured into a cylindrical container having a volume of 300 mL and an upper opening, and an initial viscosity $V_1$ of the ink in the container was measured. Next, the container with the ink was placed in a constant temperature bath of inner temperature 60° C., then a viscosity $V_2$ was measured after one month. $V_1$ and $V_2$ were measured at 25° C. using an oscillation-type viscometer (SV-10, by A&D Company, Ltd.). From the value $V_2$ and the initial viscosity $V_1$, a viscosity change rate was obtained in accordance with the formula below. The viscosity change rate of less than 110% was determined to be OK (pass), and that of 110% or higher was determined to be NG (non-pass).

Viscosity Change Rate(%)=$V_2/V_1 \times 100$ (Method of Measuring Dispersion Diameter Change Rate)

An ink of about 250 mL was poured into a cylindrical container having a volume of 300 mL and an upper opening, and an initial dispersion diameter $R_1$ of the pigment in the ink within the container was measured. Next, the container with the ink was placed in a constant temperature bath of inner temperature 60° C., and a dispersion diameter $R_2$ of the pigment was measured after one month. $R_1$ and $R_2$ were measured as a volume average particle diameter D50 of the pigment by way of diluting the ink to 300 times with ion exchange water and using the dynamic light scattering-type particle size distribution analyzer (Zetasizer Nano, by Sysmex Co.). From the values of $R_1$ and $R_2$, a dispersion diameter change rate was obtained in accordance with the formula below. The dispersion diameter change rate of less than 110% was determined to be OK (pass), and that of 110% or higher was determined to be NG (non-pass).

Dispersion Diameter Change Rate(%)=$R_2/R_1 \times 100$

TABLE 1

| | Comp. ex. 1 | Comp. ex. 2 | Ex. 1 | Ex. 2 | Ex. 3 | Comp. ex. 3 |
|---|---|---|---|---|---|---|
| Glycerin (% by mass) | — | 3 | 5 | 7 | 9 | 10 |
| Viscosity of the ink (mPa · s) 25° C. | 5.2 | 6.3 | 7.2 | 8.2 | 9.3 | 9.9 |
| 35° C. | 3.8 | 4.4 | 5.1 | 5.8 | 6.3 | 7.2 |
| Consecutive image forming time (min.) | 80 | 70 | 65 | 60 | 60 | 50 |
| | OK | OK | OK | OK | OK | NG |
| Decap Property | NG | NG | OK | OK | OK | OK |
| Image density | 1.02 | 1.03 | 1.02 | 1.04 | 1.03 | 1.02 |
| | OK | OK | OK | OK | OK | OK |
| Dispersion stability Viscosity change rate (%)/ Dispersion diameter change rate (%) | 103/102 | 101/102 | 101/102 | 104/102 | 103/101 | 104/101 |
| | OK | OK | OK | OK | OK | OK |

It is understood from Table 1 that the condition of ink droplets ejected from recording heads can be properly maintained and images with a desired image density can be obtained when forming images for a long time or even when forming images after allowing recording heads filled with the ink to stand without caps for a long time, and also the viscosity changes of the inks and conditional changes of dispersed pigments can be suppressed even after exposing the ink to a high-temperature environment for a long time, in the cases of using the inks of Examples 1 to 3 that contain water, a pigment dispersion, a humectant, and a penetrating agent, in which glycerin of from 5% to 9% by mass and 1,3-propanediol of from 30% to 45% by mass are included in the inks as the humectant and a C1-C4 monoalkyl ether of polyhydric alcohol of from 2.0% to 4.5% by mass is included in the inks as the penetrating agent.

It is understood from Comparative Examples 1 and 2 that, in the cases of using the inks where the content of glycerin is less than 5% by mass in the ink, ejection failure of ink droplets from recording heads is likely to occur when forming images after allowing the recording heads filled with the ink to stand without caps for a long time. The reason is believed that, in the inks of Comparative Examples 1 and 2, the solvents easily vaporize due to lower moisture-retaining property and thus the inks tend to thicken or be solidified near ink ejection holes of nozzles. On the other hand, it is understood from Comparative Example 3 that, in the case of using the ink where the content of glycerin is greater than 9% by mass in the ink, ejection failure of ink droplets from recording heads is likely to occur when forming images for a long time. The reason is believed that although the ink of Comparative Example 3 has a high moisture-retaining property, absolute viscosity thereof tends to increase.

Examples 4, 5 and Comparative Examples 4 to 6

The inks of Examples 4, 5 and Comparative Examples 4 to 6 were prepared respectively using one of the humectants A to E shown in Table 2. More specifically, 24% by mass of the pigment dispersion obtained in Preparation Example 2, 5.0% by mass of 2-pyrrolidone (dissolution stabilizer), 0.5% by mass of OLFINE E1010 (surfactant, ethylene oxide adduct of acetylenediol, by Nissin Chemical Industry Co.), 1.0% by mass of 1,2-octanediol, 7% by mass of glycerin, 35% by mass of humectants of the types shown in Table 3, 4.5% by mass of triethylene glycol monobutyl ether, and the remaining ion-exchange water were uniformly mixed by agitating using an agitator (Three-One Motor, BL-600, by AS ONE Co.) at a rotation number of 400 rpm, followed by filtering through a filter with a pore size of 5 μm, thereby obtaining the inks of Examples 4, 5 and Comparative Examples 4 to 6. The obtained inks were measured for viscosity at 25° C. and 35° C. using the oscillation-type viscometer (SV-10, by A&D Company, Ltd.) (Table 3).

TABLE 2

| Humectant | Compound |
|---|---|
| A | 1,2-Propanediol |
| B | 1,3-Propanediol |
| C | 1,3-Butanediol |
| D | 1,4-Butanediol |
| E | 1,5-Pentanediol |

In accordance with the methods described above, the inks of Examples 4, 5 and Comparative Examples 4 to 6 were evaluated with respect to consecutive image forming time, decap property, image density of resulting image, and dispersion stability. Table 3 shows the evaluation results of consecutive image forming time, decap property, image density of resulting image, and dispersion stability of the inks of Examples 4, 5 and Comparative Examples 4 to 6.

TABLE 3

|  |  | Comp. ex. 4 | Ex. 4 | Comp. ex. 5 | Ex. 5 | Comp ex. 6 |
|---|---|---|---|---|---|---|
| Type of humectant | | A | B | C | D | E |
| Viscosity of | 25° C. | 8.6 | 8.2 | 9.0 | 8.4 | 8.3 |
| the ink (mPa·s) | 35° C. | 5.9 | 5.8 | 6.3 | 6.1 | 6.7 |
| Consecutive image forming time (min.) | | 65 OK | 65 OK | 65 OK | 60 OK | 60 OK |
| Decap Property | | NG | OK | NG | OK | NG |
| Image density | | 1.02 OK | 1.03 OK | 1.02 OK | 1.04 OK | 1.03 OK |
| Dispersion stability Viscosity change rate (%)/Dispersion diameter change rate (%) | | 104/103 OK | 105/102 OK | 103/106 OK | 105/103 OK | 103/102 OK |

It is understood from Table 3 that the condition of ink droplets ejected from recording heads can be properly maintained and images with a desired image density can be obtained when forming images for a long time or even when forming images after allowing recording heads filled with the inks to stand without caps for a long time, and also the viscosity changes of the inks and conditional changes of dispersed pigments can be suppressed even after exposing the inks to a high-temperature environment for a long time, in the cases of using the inks of Examples 4 and 5 that contain water, a pigment dispersion, a humectant, and a penetrating agent, in which glycerin of from 5% to 9% by mass and 1,3-propanediol or 1,4-butanediol of from 30% to 45% by mass are included in the inks as the humectant and a C1-C4 monoalkyl ether of polyhydric alcohol of from 2.0% to 4.5% by mass is included in the inks as the penetrating agent.

It is understood from Comparative Example 4 that, in the case of using the ink that contains 1,2-propanediol rather than 1,3-propanediol or 1,4-butanediol as the penetrating agent, ejection failure of ink droplets from recording heads is likely to occur when forming images after allowing the recording heads filled with the ink to stand without caps for a long time. The reason is believed that, in the ink of Comparative Example 4, the solvent easily vaporizes and thus the ink tends to thicken or be solidified near ink ejection holes of nozzles.

It is understood from Comparative Example 5 that, in the case of using the ink that contains 1,3-butanediol rather than 1,3-propanediol or 1,4-butanediol as the penetrating agent, ejection failure of ink droplets from recording heads is likely to occur when forming images after allowing the recording heads filled with the ink to stand without caps for a long time. It is also understood from Comparative Example 6 that, in the case of using the ink that contains 1,5-pentanediol rather than 1,3-propanediol or 1,4-butanediol as the penetrating agent, ejection failure of ink droplets from recording heads is likely to occur when forming images after allowing the recording heads filled with the ink to stand without caps for a long time.

Examples 6 to 8 and Comparative Examples 7 to 13

24% by mass of the pigment dispersion obtained in Preparation Example 2, 5.0% by mass of 2-pyrrolidone (dissolution stabilizer), 0.5% by mass of OLFINE E1010 (surfactant, ethylene oxide adduct of acetylenediol, by Nissin Chemical Industry Co.), 1.0% by mass of 1,2-octanediol, 7% by mass of glycerin, 1,3-propanediol in the amounts of Tables 4 and 5, 4.5% by mass of triethylene glycol monobutyl ether, and the remaining ion-exchange water were uniformly mixed by agitating using an agitator (Three-One Motor, BL-600, by AS ONE Co.) at a rotation number of 400 rpm, followed by filtering through a filter with a pore size of 5 μm, thereby obtaining the inks of Examples 6 to 8 and Comparative Examples 7 to 13. The obtained inks were measured for viscosity at 25° C. and 35° C. using the oscillation-type viscometer (SV-10, by A&D Company, Ltd.) (Tables 4, 5).

In accordance with the methods described above, the inks of Examples 6 to 8 and Comparative Examples 7 to 13 were evaluated with respect to consecutive image forming time, decap property, image density of resulting image, and dispersion stability. Tables 4 and 5 show the evaluation results of consecutive image forming time, decap property, image density of resulting image, and dispersion stability of the inks of Examples 6 to 8 and Comparative Examples 7 to 13.

TABLE 4

|  |  | Comp. ex. 7 | Comp. ex. 8 | Comp. ex. 9 | Comp. ex. 10 | Comp. ex. 11 |
|---|---|---|---|---|---|---|
| 1,3-Propanediol (% by mass) | | 10 | 15 | 20 | 25 | 27 |
| Viscosity of | 25° C. | 5.5 | 6.0 | 6.5 | 6.7 | 6.9 |
| the ink (mPa·s) | 35° C. | 4.1 | 4.2 | 4.4 | 4.6 | 4.9 |
| Consecutive image forming time (min.) | | 50 NG | 50 NG | 50 NG | 55 NG | 55 NG |
| Decap Property | | NG | NG | NG | NG | NG |
| linage density | | 1.03 OK | 1.02 OK | 1.02 OK | 1.03 OK | 1.02 OK |
| Dispersion stability Viscosity change rate (%)/Dispersion diameter change rate (%) | | 104/102 OK | 103/106 OK | 104/107 OK | 104/102 OK | 103/106 OK |

TABLE 5

|  | Ex. 6 | Ex. 7 | Ex. 8 | Comp. ex. 12 | Comp. ex. 13 |
|---|---|---|---|---|---|
| 1,3-Propanediol (% by mass) | 30 | 35 | 45 | 48 | 50 |
| Viscosity of the ink (mPa · s) 25° C. | 7.2 | 8.2 | 9.2 | 9.5 | 9.7 |
| 35° C. | 5.3 | 5.8 | 6.3 | 6.5 | 6.8 |
| Consecutive image forming time (min.) | 65 OK | 65 OK | 65 OK | 70 OK | 55 NG |
| Decap Property | OK | OK | OK | NG | NG |
| Image dnsity | 1.02 OK | 1.04 OK | 1.03 OK | 1.03 OK | 1.02 OK |
| Dispersion stability | 104/107 | 105/106 | 107/106 | 109/108 | 113/116 |
| Viscosity change rate (%)/Dispersion diameter change rate (%) | OK | OK | OK | OK | NG |

It is understood from Tables 4 and 5 that the condition of ink droplets ejected from recording heads can be properly maintained and images with a desired image density can be obtained when forming images for a long time or even when forming images after allowing recording heads filled with the inks to stand without caps for a long time, and also the viscosity changes of the inks and conditional changes of dispersed pigments can be suppressed even after exposing the inks to a high-temperature environment for a long time, in the cases of using the inks of Examples 6 to 8 that contain water, a pigment dispersion, a humectant, and a penetrating agent, in which glycerin of from 5% to 9% by mass and 1,3-propanediol of from 30% to 45% by mass are included in the inks as the humectant and a C1-C4 monoalkyl ether of polyhydric alcohol of from 2.0% to 4.5% by mass is included in the inks as the penetrating agent.

It is understood from Comparative Examples 7 to 11 that, in the cases of using the inks where the content of 1,3-propanediol is less than 30% by mass in the ink, ejection failure of ink droplets from recording heads tends to occur when forming images for a long time, and also ejection failure of ink droplets from recording heads is likely to occur when forming images after allowing the recording heads filled with the ink to stand without caps for a long time. The reason is believed that, in the inks of Comparative Examples 7 to 11, since moisture-retaining propertie thereof are low and thus solvents thereof easily vaporize, the inks tend to thicken or be solidified near ink ejection holes of nozzles.

It is understood from Comparative Examples 12 and 13 that, in the cases of using the inks where the content of 1,3-propanediol is greater than 45% by mass in the ink, ejection failure of ink droplets from recording heads is likely to occur when forming images after allowing the recording heads filled with the inks to stand without caps for a long time. The reason is believed that, in the inks of Comparative Examples 12 and 13, the moisture-retaining properties of the inks are poor since the proportional contents of glycerin are low in the humectant, and thus the inks tend to thicken or be solidified near ink ejection holes of nozzles. It is also understood from Comparative Example 13 that, in the case where the content of 1,3-propanediol is excessively large, viscosity change of the ink and conditional change of dispersed pigment are likely to occur after exposing the ink to a high-temperature environment for a long time.

Examples 9 to 11 and Comparative Examples 14 to 17

24% by mass of the pigment dispersion obtained in Preparation Example 2, 5.0% by mass of 2-pyrrolidone (dissolution stabilizer), 0.5% by mass of OLFINE E1010 (surfactant, ethylene oxide adduct of acetylenediol, by Nissin Chemical Industry Co.), 1.0% by mass of 1,2-octanediol, 7% by mass of glycerin, 1,4-butanediol in the amounts of Tables 6 and 7, 4.5% by mass of triethylene glycol monobutyl ether, and the remaining ion-exchange water were uniformly mixed by agitating using an agitator (Three-One Motor, BL-600, by AS ONE Co.) at a rotation number of 400 rpm, followed by filtering through a filter with a pore size of 5 μm, thereby obtaining the inks of Examples 9 to 11 and Comparative Examples 14 to 17. The obtained inks were measured for viscosity at 25° C. and 35° C. using the oscillation-type viscometer (SV-10, by A&D Company, Ltd.) (Tables 6, 7).

In accordance with the methods described above, the inks of Examples 9 to 11 and Comparative Examples 14 to 17 were evaluated with respect to consecutive image forming time, decap property, image density of resulting image, and dispersion stability. Tables 6 and 7 show the evaluation results of consecutive image forming time, decap property, image density of resulting image, and dispersion stability of the inks of Examples 9 to 11 and Comparative Examples 14 to 17.

TABLE 6

|  | Comp. ex. 14 | Comp. ex. 15 | Ex. 9 | Ex. 10 |
|---|---|---|---|---|
| 1,4-Butanediol (% by mass) | 25 | 27 | 30 | 35 |
| Viscosity of the ink (mPa · s) 25° C. | 6.6 | 6.8 | 7.4 | 8.4 |
| 35° C. | 4.6 | 4.8 | 5.2 | 6.0 |
| Consecutive image forming time (min.) | 50 NG | 55 NG | 60 OK | 60 OK |
| Decap Property | NG | NG | OK | OK |
| Image dnsity | 1.04 OK | 1.02 OK | 1.04 OK | 1.02 OK |
| Dispersion stability | 104/102 | 103/105 | 104/104 | 103/102 |
| Viscosity change rate (%)/Dispersion diameter change rate (%) | OK | OK | OK | OK |

TABLE 7

|  | Ex. 11 | Comp. ex. 16 | Comp. ex. 17 |
|---|---|---|---|
| 1,4-Butanediol (% by mass) | 45 | 48 | 50 |
| Viscosity of the ink (mPa · s) 25° C. | 9.4 | 9.6 | 10.3 |
| 35° C. | 6.5 | 6.7 | 6.8 |
| Consecutive image forming time (min.) | 60 OK | 60 OK | 60 OK |
| Decap Property | OK | NG | NG |
| Image dnsity | 1.03 OK | 1.02 OK | 1.03 OK |
| Dispersion stability | 107/104 | 103/105 | 112/116 |
| Viscosity change rate (%)/Dispersion diameter change rate (%) | OK | OK | NG |

It is understood from Tables 6 and 7 that the condition of ink droplets ejected from recording heads can be properly maintained and images with a desired image density can be obtained when forming images for a long time or even when forming images after allowing recording heads filled with the inks to stand without caps for a long time, in the cases of using the inks of Examples 9 to 11 that contain water, a pigment dispersion, a humectant, and a penetrating agent, in which glycerin of from 5% to 9% by mass and 1,4-butanediol of from 30% to 45% by mass are included in the inks as the humectant and a C1-C4 monoalkyl ether of polyhydric alcohol of from 2.0% to 4.5% by mass is included in the inks as the penetrating agent. It is also understood from Tables 6 and 7 that the viscosity changes of the inks and conditional changes of dispersed pigments can be suppressed in the inks of Examples 9 to 11 even after exposing the inks to a high-temperature environment for a long time.

It is understood from Comparative Examples 14 and 15 that, in the cases of using the inks where the content of 1,4-butanediol is less than 30% by mass in the ink, ejection failure of ink droplets from recording heads tends to occur when forming images for a long time, and also ejection failure of ink droplets from recording heads is likely to occur when forming images after allowing the recording heads filled with the inks to stand without caps for a long time. The reason is believed that, in the inks of Comparative Examples 14 and 15, since moisture-retaining properties thereof are low and thus solvents thereof easily vaporize, the inks tend to thicken or be solidified near ink ejection holes of nozzles.

It is understood from Comparative Examples 16 and 17 that, in the cases of using the inks where the content of 1,4-butanediol is greater than 45% by mass in the ink, ejection failure of ink droplets from recording heads is likely to occur when forming images after allowing the recording heads filled with the ink to stand without caps for a long time. The reason is believed that the inks of Comparative Examples 16 and 17 tend to thicken or be solidified near ink ejection holes of nozzles.

Examples 12 to 14

24% by mass of the pigment dispersion obtained in Preparation Example 2, 5.0% by mass of 2-pyrrolidone (dissolution stabilizer), 0.5% by mass of OLFINE E1010 (surfactant, ethylene oxide adduct of acetylenediol, by Nissin Chemical Industry Co.), 1.0% by mass of 1,2-octanediol, 7% by mass of glycerin, 1,3-propanediol and 1,4-butanediol in the amounts of Table 8, 4.5% by mass of triethylene glycol monobutyl ether, and the remaining ion-exchange water were uniformly mixed by agitating using an agitator (Three-One Motor, BL-600, by AS ONE Co.) at a rotation number of 400 rpm, followed by filtering through a filter with a pore size of 5 μm, thereby obtaining the inks of Examples 12 to 14. The obtained inks were measured for viscosity at 25° C. and 35° C. using the oscillation-type viscometer (SV-10, by A&D Company, Ltd.) (Table 8).

In accordance with the methods described above, the inks of Examples 12 to 14 were evaluated with respect to consecutive image forming time, decap property, image density of resulting image, and dispersion stability. Table 8 shows the evaluation results of consecutive image forming time, decap property, image density of resulting image, and dispersion stability of the inks of Examples 12 to 14.

TABLE 8

|  |  | Ex. 12 | Ex. 13 | Ex. 14 |
|---|---|---|---|---|
| 1,3-Propanediol (% by mass) |  | 30 | 17.5 | 5 |
| 1,4-Butanediol (% by mass) |  | 5 | 17.5 | 30 |
| Viscosity of the ink (mPa·s) | 25° C. | 7.3 | 7.8 | 8.2 |
|  | 35° C. | 5.3 | 5.6 | 5.9 |
| Consecutive image forming time (min.) |  | 65 | 65 | 65 |
| Decap Property |  | OK | OK | OK |

TABLE 8-continued

|  | Ex. 12 | Ex. 13 | Ex. 14 |
|---|---|---|---|
| Image dnsity | 1.02 | 1.04 | 1.03 |
|  | OK | OK | OK |
| Dispersion stability | 103/103 | 105/106 | 105/105 |
| Viscosity change rate (%)/Dispersion diameter change rate (%) | OK | OK | OK |

It is understood from Table 8 that the condition of ink droplets ejected from recording heads can be properly maintained and images with a desired image density can be obtained when forming images for a long time or even when forming images after allowing recording heads filled with the inks to stand without caps for a long time, in the cases of using the inks of Examples 12 to 14 that contain water, a pigment dispersion, a humectant, and a penetrating agent, in which glycerin of from 5% to 9% by mass and 1,3-propanediol and 1,4-butanediol of from 30% to 45% by mass are included in the inks as the humectant, and a C1-C4 monoalkyl ether of polyhydric alcohol of from 2.0% to 4.5% by mass is included in the inks as the penetrating agent. It is also understood from Table 8 that the viscosity changes of the inks and conditional changes of dispersed pigments can be suppressed in the inks of Examples 12 to 14 even after exposing the inks to a high-temperature environment for a long time.

Examples 15 to 27 and Comparative Examples 18 to 31

The inks of Examples 15 to 27 and Comparative Examples 18 to 31 were prepared respectively using one or two of the humectants A to F shown in Table 9. More specifically, 24% by mass of the pigment dispersion obtained in Preparation Example 2, 5.0% by mass of 2-pyrrolidone (dissolution stabilizer), 0.5% by mass of OLFINE E1010 (surfactant, ethylene oxide adduct of acetylenediol, by Nissin Chemical Industry Co.), 1.0% by mass of 1,2-octanediol, 7% by mass of glycerin, 35% by mass of 1,3-propanediol, penetrating agents of the types and amounts shown in Tables 10 to 16, and the remaining ion-exchange water were uniformly mixed by agitating using an agitator (Three-One Motor, BL-600, by AS ONE Co.) at a rotation number of 400 rpm, followed by filtering through a filter with a pore size of 5 μm, thereby obtaining the inks of Examples 15 to 27 and Comparative Examples 18 to 31. The obtained inks were measured for viscosity at 25° C. and 35° C. using the oscillation-type viscometer (SV-10, by A&D Company, Ltd.) (Tables 10 to 16).

TABLE 9

| Penetrating agent | Compound |
|---|---|
| A | Triethylene glycol monobutyl ether |
| B | Triethylene glycol monomethyl ether |
| C | 1,2-Hexylene glycol |
| D | Diethylene glycol monomethyl ether |
| E | Diethylene glycol monoisopropyl ether |
| F | Diethylene glycol monoisobutyl ether |

In accordance with the methods described above, the inks of Examples 15 to 27 and Comparative Examples 18 to 31 were evaluated with respect to consecutive image forming time, decap property, image density of resulting image, and dispersion stability. Tables 10 to 16 show the evaluation results of consecutive image forming time, decap property, image density of resulting image, and dispersion stability of the inks of Examples 15 to 27 and Comparative Examples 18 to 31.

TABLE 10

|  |  | Comp. ex. 18 | Ex. 15 | Ex. 16 | Ex. 17 | Comp. ex. 19 |
|---|---|---|---|---|---|---|
| Penetrating agent A (% by mass) |  | — | 2.0 | 3.0 | 4.5 | 5.0 |
| Viscosity of the ink (mPa·s) | 25° C. | 7.6 | 7.8 | 8.0 | 8.2 | 8.3 |
|  | 35° C. | 5.3 | 5.4 | 5.6 | 5.8 | 5.9 |
| Consecutive image forming time (min.) |  | 60 OK | 60 OK | 60 OK | 60 OK | 60 OK |
| Decap Property |  | OK | OK | OK | OK | OK |
| Image density |  | 0.96 NG | 1.03 OK | 1.02 OK | 1.04 OK | 1.02 OK |
| Dispersion stability |  | 104/102 | 106/105 | 104/103 | 107/106 | 107/112 |
| Viscosity change rate (%)/Dispersion diameter change rate (%) |  | OK | OK | OK | OK | NG |

TABLE 11

|  |  | Comp. ex. 20 | Ex. 18 | Ex. 19 | Comp. ex. 21 |
|---|---|---|---|---|---|
| Penetrating agent B (% by mass) |  | 0.5 | 2.0 | 4.5 | 5.0 |
| Viscosity of the ink (mPa·s) | 25° C. | 7.4 | 7.6 | 8.0 | 8.1 |
|  | 35° C. | 5.3 | 5.5 | 5.7 | 5.8 |
| Consecutive image forming time (min.) |  | 60 OK | 60 OK | 60 OK | 60 OK |
| Decap Property |  | OK | OK | OK | NG |
| Image density |  | 0.98 NG | 1.02 OK | 1.03 OK | 1.02 OK |
| Dispersion stability |  | 102/101 | 104/102 | 102/103 | 112/124 |
| Viscosity change rate (%)/Dispersion diameter change rate (%) |  | OK | OK | OK | NG |

TABLE 12

|  |  | Comp. ex. 22 | Comp. ex. 23 | Comp. ex. 24 | Comp. ex. 25 |
|---|---|---|---|---|---|
| Penetrating agent C (% by mass) |  | 0.5 | 2.0 | 3.0 | 5.0 |
| Viscosity of the ink (mPa·s) | 25° C. | 8.1 | 8.4 | 8.5 | 8.8 |
|  | 35° C. | 6.0 | 6.2 | 6.3 | 6.5 |
| Consecutive image forming time (min.) |  | 60 OK | 60 OK | 60 OK | 60 OK |
| Decap Property |  | OK | OK | NG | NG |
| Image density |  | 0.94 NG | 0.98 NG | 1.03 OK | 1.03 OK |
| Dispersion stability |  | 102/101 | 104/102 | 113/103 | 130/40 |
| Viscosity change rate (%)/Dispersion diameter change rate (%) |  | OK | OK | NG | NG |

TABLE 13

|  |  | Comp. ex. 26 | Ex. 20 | Ex. 21 | Comp. ex. 27 |
|---|---|---|---|---|---|
| Penetrating agent D (% by mass) |  | 0.5 | 2.0 | 4.5 | 5.0 |
| Viscosity of the ink (mPa·s) | 25° C. | 1.1 | 7.5 | 7.8 | 8.0 |
|  | 35° C. | 5.0 | 5.2 | 5.5 | 5.6 |
| Consecutive image forming time (min.) |  | 60 OK | 60 OK | 60 OK | 60 OK |
| Decap Property |  | OK | OK | OK | NG |
| Image density |  | 0.96 NG | 1.00 OK | 1.01 OK | 1.01 OK |
| Dispersion stability |  | 102/101 | 104/102 | 102/103 | 111/113 |
| Viscosity change rate (%)/Dispersion diameter change rate (%) |  | OK | OK | OK | NG |

TABLE 14

|  |  | Comp. ex. 28 | Ex. 22 | Ex. 23 | Comp. ex. 29 |
|---|---|---|---|---|---|
| Penetrating agent E (% by mass) |  | 0.7 | 2.5 | 4.5 | 5.0 |
| Viscosity of the ink (mPa·s) | 25° C. | 7.3 | 7.4 | 7.9 | 8.0 |
|  | 35° C. | 5.2 | 5.5 | 5.6 | 5.8 |
| Consecutive image forming time (min.) |  | 60 OK | 60 OK | 60 OK | 60 OK |
| Decap Property |  | OK | OK | OK | NG |
| Image density |  | 0.9 NG | 1.03 OK | 1.03 OK | 1.01 OK |
| Dispersion stability |  | 102/101 | 104/102 | 102/103 | 110/116 |
| Viscosity change rate (%)/Dispersion diameter change rate (%) |  | OK | OK | OK | NG |

TABLE 15

|  |  | Comp. ex. 30 | Ex. 24 | Ex. 25 | Comp. ex. 31 |
|---|---|---|---|---|---|
| Penetrating agent F (% by mass) |  | 0.7 | 2.0 | 4.5 | 5.0 |
| Viscosity of the ink (mPa·s) | 25° C. | 7.4 | 7.5 | 8.0 | 8.1 |
|  | 35° C. | 5.3 | 5.6 | 5.6 | 5.8 |
| Consecutive image forming time (min.) |  | 60 OK | 60 OK | 60 OK | 60 OK |
| Decap Property |  | OK | OK | OK | NG |
| Image density |  | 0.98 NG | 1.02 OK | 1.02 OK | 1.02 OK |
| Dispersion stability |  | 102/101 | 104/102 | 102/103 | 120/120 |
| Viscosity change rate (%)/Dispersion diameter change rate (%) |  | OK | OK | OK | NG |

TABLE 16

|  |  | Ex. 26 | Ex. 27 |
|---|---|---|---|
| Penetrating agent A (% by mass) |  | 2.0 | 1.0 |
| Penetrating agent B (% by mass) |  | 1.0 | 2.0 |
| Viscosity of the ink (mPa·s) | 25° C. | 7.9 | 7.5 |
|  | 35° C. | 5.5 | 5.6 |
| Consecutive image forming ime (min.) |  | 60 OK | 60 OK |
| Decap Property |  | OK | OK |
| Image density |  | 1.01 OK | 1.02 OK |
| Dispersion stability |  | 103/103 | 104/103 |
| Viscosity change rate (%)/Dispersion diameter change rate (%) |  | OK | OK |

It is understood from Tables 10 to 16 that the condition of ink droplets ejected from recording heads can be properly maintained and images with a desired image density can be obtained when forming images for a long time or even when forming images after allowing recording heads filled with the ink to stand without caps for a long time, in the cases of using the inks of Examples 15 to 27 that contain water, a pigment dispersion, a humectant, and a penetrating agent, in which glycerin of from 5% to 9% by mass and 1,4-butanediol of from 30% to 45% by mass are included in the inks as the humectant, and a C1-C4 monoalkyl ether of polyhydric alcohol of from 2.0% to 4.5% by mass is included in the inks as the penetrating agent. It is also understood from Tables 10 to 16 that the viscosity changes of the inks and conditional changes of dispersed pigments can be suppressed in the inks of Examples 15 to 27 even after exposing the inks to a high-temperature environment for a long time.

It is understood from Comparative Examples 18, 20, 26, 28, and 30 that, in the cases of using the inks where the content of C1-C4 monoalkyl ether of polyhydric alcohol is less than 2.0% by mass in the ink, it is difficult to form images with a desired image density. The reason is believed that permeability into the recording medium is poor in the inks of Comparative Examples 18, 20, 26, 28, and 30. On the other hand, it is understood from Comparative Examples 19, 21, 27, 29, and 31 that the content of C1-C4 monoalkyl ether of polyhydric alcohol of greater than 4.5% by mass leads to a tendency to change the viscosities of the inks and dispersed conditions of the pigments, after exposing the inks to a high-temperature environment for a long time although having sufficiently high permeability into the recording medium. When an excessively large content of triethylene glycol monobutyl ether is used as the C1-C4 monoalkyl ether of polyhydric alcohol, ejection failure tends to occur when forming images after allowing recording heads filled with the ink to stand without caps for a long time.

It is understood from Comparative Examples 22 and 23 that it is difficult to form images with a desired image density in the cases of using the inks containing 1,2-hexylene glycol as the penetrating agent rather than C1-C4 monoalkyl ether of polyhydric alcohol in the content of 2.0% by mass or less in the ink. It is also understood from Comparative Examples 24 and 25 that, in the cases of the inks containing 1,2-hexylene glycol as the penetrating agent in the content of greater than 2.0% by mass in the ink, the viscosity changes of the inks and conditional changes of dispersed pigments are likely to occur due to exposing the inks to a high-temperature environment for a long time and also ejection failure tends to occur when forming images after allowing recording heads filled with the ink to stand without caps for a long time.

What is claimed is:

1. An ink for an ink-jet recording apparatus, comprising water, a pigment dispersion, a humectant, and a penetrating agent, wherein
   the humectant comprises glycerin, and 1,3-propanediol and/or 1,4-butanediol,
   a content of the glycerin is from 5% to 9% by mass in the ink,
   a total content of the 1,3-propanediol and/or 1,4-butanediol is from 30% to 45% by mass in the ink,
   the penetrating agent is a C1-C4 monoalkyl ether of polyhydric alcohol, and
   a content of the C1-C4 monoalkyl ether of polyhydric alcohol is from 2.0% to 4.5% by mass in the ink,
   wherein the C1-C4 monoalkyl ether of polyhyric comprises at least one selected from the group consisting of triethylene glycol monobutyl ether, triethylene gycol monometheyl ether, diethylene glycol monomethyl ether, diethylene glycol monoisopropyl ether, and diethylene glycol monoisobutyl ether.

2. A method of forming an image comprising:
   providing the ink according to claim 1 to an ink-jet recording apparatus; and
   forming the image with the ink-jet recording apparatus using the ink.

3. The method according to claim 2, wherein the ink-jet recording apparatus comprises a recording head for ejecting droplets of the ink as a result of a pressure occurring in a liquid chamber by controlling a voltage applied to a piezoelectric element and employs a line head-type recording system, and
   the recording head ejects the ink using a pull-shot system where the pressure in the liquid chamber is reduced by controlling the voltage applied to the piezoelectric element and then the pressure in the liquid chamber is returned again.

4. The method according to claim 2, wherein the ink is warmed from 32° C. to 35° C. during image formation in the ink-jet recording apparatus.

\* \* \* \* \*